United States Patent
Minnen et al.

(10) Patent No.: US 11,670,010 B2
(45) Date of Patent: *Jun. 6, 2023

(54) DATA COMPRESSION USING CONDITIONAL ENTROPY MODELS

(71) Applicant: Google LLC, Mountain View, CA (US)

(72) Inventors: David Charles Minnen, Mountain View, CA (US); Saurabh Singh, Mountain View, CA (US); Johannes Balle, San Francisco, CA (US); Troy Chinen, Newark, CA (US); Sung Jin Hwang, Mountain View, CA (US); Nicholas Johnston, San Jose, CA (US); George Dan Toderici, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/578,794

(22) Filed: Jan. 19, 2022

(65) Prior Publication Data
US 2022/0138991 A1 May 5, 2022

Related U.S. Application Data

(63) Continuation of application No. 16/515,586, filed on Jul. 18, 2019, now Pat. No. 11,257,254.
(Continued)

(51) Int. Cl.
*G06T 9/00* (2006.01)
*G06N 20/00* (2019.01)
(Continued)

(52) U.S. Cl.
CPC .............. *G06T 9/001* (2013.01); *G06F 17/18* (2013.01); *G06N 3/08* (2013.01); *G06N 20/00* (2019.01); *G06T 3/40* (2013.01); *G06T 9/002* (2013.01)

(58) Field of Classification Search
CPC ........ G06N 3/08; G06N 20/00; G06N 3/0472; G06N 3/0454; G06T 9/001; G06T 3/40; G06T 9/002; G06F 17/18
See application file for complete search history.

(56) References Cited

U.S. PATENT DOCUMENTS

| 2007/0016415 A1* | 1/2007 | Thumpudi | G10L 19/03 704/E19.014 |
| 2007/0016418 A1* | 1/2007 | Mehrotra | H04N 19/13 375/E7.129 |

(Continued)

OTHER PUBLICATIONS

"Information technology—JPEG 2000 image coding system," International Organization for Standardization, Dec. 2000, 7 pages.
(Continued)

*Primary Examiner* — Qun Shen
(74) *Attorney, Agent, or Firm* — Fish & Richardson P.C.

(57) ABSTRACT

Methods, systems, and apparatus, including computer programs encoded on a computer storage medium, for compressing and decompressing data. In one aspect, a method comprises: processing data using an encoder neural network to generate a latent representation of the data; processing the latent representation of the data using a hyper-encoder neural network to generate a latent representation of an entropy model; generating an entropy encoded representation of the latent representation of the entropy model; generating an entropy encoded representation of the latent representation of the data using the latent representation of the entropy model; and determining a compressed representation of the data from the entropy encoded representations of: (i) the latent representation of the data and (ii) the latent representation of the entropy model used to entropy encode the latent representation of the data.

20 Claims, 7 Drawing Sheets

Page 2

Related U.S. Application Data

(60) Provisional application No. 62/701,264, filed on Jul. 20, 2018.

(51) Int. Cl.
  *G06F 17/18*    (2006.01)
  *G06N 3/08*     (2023.01)
  *G06T 3/40*     (2006.01)

(56) References Cited

U.S. PATENT DOCUMENTS

| | | | |
|---|---|---|---|
| 2012/0290511 | A1 | 11/2012 | Frank |
| 2017/0330077 | A1* | 11/2017 | Williams ............... G06N 3/04 |
| 2018/0234697 | A1 | 8/2018 | Jang |
| 2018/0270485 | A1* | 9/2018 | Jang ..................... H04N 19/503 |
| 2018/0309983 | A1 | 10/2018 | Heo |
| 2018/0352247 | A1* | 12/2018 | Park ..................... H04N 19/513 |
| 2019/0392304 | A1* | 12/2019 | Aliper ................... G06N 3/0472 |

OTHER PUBLICATIONS

Ágústsson et al., "Soft-to-hard vector quantization for end-to-end learning compressible representation" Advances in Neural Information Processing Systems 30, pp. 1141-1151, 2017, 16 pages.
Alemi et al., "Fixing a broken elbo," CoRR, vol. abs/1711.00464, 2017, 21 pages.
Asuni et al., "Testimages: A large-scale archive for testing visual devices and basic image processing algorithms" Proc. of STAG: Smart Tools and Apps for Graphics, 2014, 8 pages.
Baig et al., "Learning to inpaint for image compression" Advances in Neural Information Processing Systems 30, pp. 1246-1255, 2017, 10 pages.
Balle et al., "Density modeling of images using a generalized normalization transformation" 4th Int. Conf. on Learning Representations, 2016, 14 pages.
Balle et al., "End-to-end optimization image compression" 5th Int. Conf. on Learning Representations, 2017, 27 pages.
Balle et al., "Joint Optimization of Context Prediction and Hyperpriors for Learned Image Compression" Neural Information Processing Systems, 2018, 10 pages.
Balle et al., "Variational image compression with a scale hyperprior" 6th Int. Conf. on Learning Representations, 2018, 47 pages.
Bellard, BPG image format (http://bellard.org/bpg/), Accessed: Jan. 30, 2017. [Online]. Available: http://bellard.org/bpg/.
Bishop et al., "Latent variable models" Learning in Graphical Models, pp. 371-403, 1999, 33 pages.
Cardoso, "Dependence, Correlation and Gaussianity in Independent Component Analysis" Journal of Machine Learning Research 4, pp. 1177-1203, 2003, 27 pages.
Chen et al., "Variational Lossy Autoencoder," 5th Int. Conf. on Learning Representations, 2017, 17 pages.
Cottrell et al., "Image compression by back propagation: An example of extensional programming" Models of Cognition: A Review of Cognitive Science, pp. 461-473, 1989, 16 pages.
Google, WebP: Compression techniques, Accessed: Jan. 30, 2017 [Online]. Available: http://developers.google.com/speed/webp/docs/compression.
Goyal, "Theoretical foundations of transform coding," IEEE Singnal Processing Magazine, vol. 18, No. 5, 2001, 13 pages.
Gregor et al., "Towards conceptual compression," in Advances in Neural Information Processing Systems 29, pp. 3549-3557, 2016, 14 pages.
Gulrajani et al., "PixelVAE: A latent variable model for natural images," 5th Int. Conf. on Learning Representations, 2017, 9 pages.
Higgins et al., "β-VAE: Learning basic visual concepts with a constrained variational framework," 5th Int. Conf. on Learning Representations, 2017, 13 pages.
Hinton et al. "Reducing the dimensionality of data with neural networks" Science, vol. 313, No. 5786, pp. 504-507, Jul. 2006, 5 pages.

ITU-R rec. H.265 & ISO/IEC 23008-2: High efficiency video coding, 2013, 634 pages.
Jiang, "Image compression with neural networks—a survey" Signal Processing: Image Communications, vol. 14, pp. 737-760, 1999, 24 pages.
Jonhston et al., "Improved lossy image compression with priming and spatially adaptive bit rates for recurrent networks" 2018 IEEE Conf. on Computer Vision and Pattern Recognition, 2018, 9 pages.
Kingma et al., "Auto-encoding variational bayes," 2nd Int. Conf. on Learning Representations, 2014, 14 pages.
Kingma et al., "Adam: A Method for Stochastic Optimization" 3rd Int. Conf. on Learning Representations, 2015, 15 pages.
Kodak, "Kodak lossless tme color image suite: PhotoCD PCD0992" [Online]. Available:http://r0k.us/graphics/kodak/, 4 pages.
Lake et al., "Human-level concept learning through probabilistic program induction," Science, No. 350(6266), pp. 1332-1338, 2015, 8 pages.
LeCun et al., "MNIST handwritten digit database," 2010. [Online]. Available:http://yann.lecun.com/exdb/mnist/, 8 pages.
Li et al., "Learning convolutional networks for content-weighted image compression" arXiv, 2017, 11 pages.
Liu et al., "Deep learning face attributes in the wild," Proceedings of International Conference on Computer Vision, Dec. 2015, 11 pages.
Lucas et al, "Auxiliary Guided Autoregressive Variational Autoencoders" 19th International Conference, Nov. 2017, 9 pages.
Luttrell, "Image compression using a neural network" Pattern Recognition Letters, vol. 10, pp. 1231-1238, Oct. 1988, 8 pages.
Lyn et al., "Modeling Multiscale Subbands of Photographic Images with Fields of Gaussian Scale Mixtures" IEEE Transactions on Pattern Analysis and Machine Intelligence 31.4, 2009, 14 pages.
Martin, "Range encoding: An algorithm for removing redundancy from a digitized message" Video & Data Recording Conference, Jul. 1979, 11 pages.
Mentzer et al., "Conditional probability models for deep image compression" 2018 IEEE Conf. on Computer Vision and Pattern Recognition, 2018, 9 pages.
Miggen et al, "Joint Autoregressive and Hierarchical Priors for Learned Image Compression" arxiv, Sep. 2018, 22 pages.
Minnen et al., "Image-dependent local entropy models for image compression with deep networks" International Conference on Image Processing, 2018, 5 pages.
Minnen et al., "Spatially adaptive image compression using a tiled deep network" International Conference on Image Processing, 2017, 5 pages.
PCT International Preliminary Report of Corresponding Application No. PCT/US2019/042769, dated Feb. 4, 2021, 16 pages.
PCT International Search Report and Written Opinion in International Application No. PCT/US2019/042769, dated Nov. 5, 2019, 22 pages.
Ponomarenko et al., "Image database TID2013," Image Commun., vol. 30, No. C, pp. 57-77, Jan. 2015, 21 pages.
Radford et al., "Unsupervised representation learning with deep convolutional generative adversarial networks," CoRR, vol. abs/1511.06434, 2015, 16 pages.
Rippel et al., "Real-time adaptive image compressions" Proc. of Machine Learning Research, vol. 70, pp. 2922-2930, 2017, 16 pages.
Rissanen et al., "Universal modeling and coding," IEEE Transactions on 288 Information Theory, vol. 27, No. 1, 1981, 12 pages.
Rumelhart et al., "Learning Internal Representations by Error Propagation" Parallel distributed processing: Explorations in the micro structure of cognition, vol. 1, pp. 318-362, 1986, 45 pages.
Rumelhart et al., "Parallel distributed processing: Explorations in the microstructure of cognition, vol. 1", The PDP Perspective, Learning Internal Representations by Error Propogation, pp. 318-362.
Santurkar et al., "Generative Compression" arXiv, 2017, 10 pages.
Sønderby et al., "Ladder variational autoencoders" Advances in Neural Information Processing Systems 29, pp. 3738-3746, 2016, 12 pages.
Theis et al., "Lossy image compression with compressive autoencoders" 5th Int. Conf. on Learning Representations, 2017, 19 pages.

(56) References Cited

OTHER PUBLICATIONS

Toderici et al., "Full resolution image compression with recurrent neural networks" 2017 IEEE Conference n Computer Vision and Pattern Recognition, 2017, 9 pages.
Toderici et al., "Variable rate image compression with recurrent neural networks" 4th Int. Conf. on Learning Representations, 2016.
Van den Oord et al., "Conditional image generation with pixelcnn decoders" Advances in Neural Information Processing Systems 29, pp. 4790-4798, 2016, 13 pages.
Van Leeuwen, "On the construction of huffman trees" ICALP, pp. 382-410, 1976, 30 pages.
Wainwright et al., "Scale mixtures of gaussians and the statistics of natural images" Proceedings of the 12th International Conference on Neural Information Processing Systems, pp. 855-861, 1999, 7 pages.
Wang et al., "Image quality assessment: From error measurement to structural similarity" IEEE Trans. Image Processing, vol. 13, Jan. 2004, 14 pages.
Wang et al., "Multiscale structural similarity for image quality assessment" Signals, Systems and Computers, 2004, Conference Record of the Thirty-Seventh Asilomar Conference on, IEEE, vol. 2, pp. 1398-1402, 2003, 5 pages.
Watkins, "Data compression using artificial neural networks" Naval Postgraduate School, 1991, 93 pages.
EP Office Action in European Appln. 19749522.9, dated Nov. 2, 2022, 9 pages.

\* cited by examiner

DATA COMPRESSION USING CONDITIONAL ENTROPY MODELS

CROSS-REFERENCE TO RELATED APPLICATIONS

This patent application is a continuation (and claims the benefit of priority under 35 USC 120) of U.S. patent application Ser. No. 16/515,586, entitled "DATA COMPRESSION USING CONDITIONAL ENTROPY MODELS," filed Jul. 18, 2019, which claims the benefit under 35 U.S.C. § 119(e) of U.S. patent application Ser. No. 62/701,264, entitled "DATA COMPRESSION USING CONDITIONAL ENTROPY MODELS," filed Jul. 20, 2018. The disclosures of the foregoing applications are incorporated herein by reference in its entirety for all purposes.

BACKGROUND

This specification relates to data compression.

Compressing data refers to determining a representation of the data that occupies less space in a memory and/or requires less bandwidth for transmission, e.g. over a network. Compressed data may be stored (e.g., in a logical data storage area or physical data storage device), transmitted to a destination over a communications network (e.g., the Internet), or used in any other manner. Generally, the data can be reconstructed (either approximately or exactly) from the compressed representation of the data.

SUMMARY

This specification describes systems implemented as computer programs on one or more computers in one or more locations that perform data compression and data decompression.

According to a first aspect there is provided a method implemented by a data processing apparatus, the method including processing data using an encoder neural network to generate a latent representation of the data. The latent representation of the data is processed using a hyper-encoder neural network to generate a latent representation of an entropy model, where the entropy model is defined by one or more probability distribution parameters characterizing one or more code symbol probability distributions. An entropy encoded representation of the latent representation of the entropy model is generated. An entropy encoded representation of the latent representation of the data is generated using the latent representation of the entropy model, including determining the probability distribution parameters defining the entropy model using the latent representation of the entropy model. Code symbols of a quantization of the latent representation of the data are autoregressively processed by one or more neural network layers to generate a set of context outputs. The context outputs and a quantization of the latent representation of the entropy model are processed by one or more neural network layers to generate the probability distribution parameter defining the entropy model. The entropy encoded representation of the latent representation of the data is generated using the entropy model. A compressed representation of the data is determined from the entropy encoded representations of: (i) the latent representation of the data and (ii) the latent representation of the entropy model used to entropy encode the latent representation of the data.

In some implementations, the data includes an image and the encoder neural network is a convolutional neural network.

In some implementations, processing the data using an encoder neural network to generate a latent representation of the data includes determining an ordered collection of code symbols representing the data by quantizing the latent representation of the data.

In some implementations, generating the entropy encoded representation of the latent representation of the entropy model includes quantizing the latent representation of the entropy model.

In some implementations, the entropy model is defined by a respective code symbol probability distribution for each code symbol in the ordered collection of code symbols representing the data.

In some implementations, each code symbol probability distribution is a Gaussian distribution convolved with a uniform distribution, and the respective probability distribution parameters defining each code symbol probability distribution include respective mean and standard deviation parameters of the Gaussian distribution.

In some implementations, generating the entropy encoded representation of the latent representation of the entropy model includes entropy encoding the quantized latent representation of entropy model using one or more predetermined probability distributions.

In some implementations, generating the entropy encoded representation of the latent representation of the data using the entropy model includes arithmetic encoding the ordered collection of code symbols representing the data using the code symbol probability distributions defining the entropy model.

In some implementations, the code symbols of the quantized latent representation of the data are associated with an ordering. Autoregressively processing the code symbols of the quantized latent representation of the data by one or more neural network layers to generate the plurality of context outputs includes generating a respective context output for each code symbol of the quantized latent representation of the data. Generating the context output for a given code symbol of the quantized latent representation of the data includes processing an input that includes one or more code symbols of the quantized latent representation of the data that precede the given code symbol of the quantized latent representation of the data using the one or more neural network layers to generate the context output for the given code symbol of the quantized latent representation of the data.

In some implementations, the input does not include either: (i) the given code symbol of the quantized latent representation of the data, or (ii) any code symbols of the quantized latent representation of the data that follow the given code symbol of the quantized latent representation of the data.

In some implementations, the one or more neural network layers are masked convolutional neural network layers.

In some implementations, processing the context outputs and the quantized latent representation of the entropy model by one or more neural network layers to generate the probability distribution parameters defining the entropy model includes generating respective probability distribution parameters characterizing a respective code symbol probability distribution for each code symbol of the quantized latent representation of the data. For each code symbol of the quantized latent representation of the data, an input including: (i) a context output for the code symbol of the quantized latent representation of the data, and (ii) the quantized latent representation of the entropy model, is processed using the one or more neural network layers to generate the probability distribution parameters characterizing the code symbol probability distribution for the code symbol of the quantized latent representation of the data.

In some implementations, the parameters of neural network layers used to: (i) generate the compressed representation of the data, and (ii) generate a reconstruction of the data from the compressed representation of the data, are jointly trained using a machine learning training technique to optimize a rate-distortion performance measure.

In some implementations, the parameters of: (i) the hyper-encoder neural network, and (ii) the neural network layers used to autoregressively process the code symbols of the quantized latent representation of the data to generate the set of context outputs, are jointly trained using a machine learning training technique to optimize a rate-distortion performance measure.

In some implementations, the rate-distortion performance measure includes: (i) a first rate term based on a size of the entropy encoded representation of the latent representation of the data, (ii) a second rate term based on a size of the entropy encoded representation of the latent representation of the entropy model, and (iii) a distortion term based on a difference between the data and a reconstruction of the data.

In some implementations, the distortion term is scaled by a hyper-parameter determining a rate-distortion tradeoff.

In some implementations, the encoder neural network includes one or more generalized divisive normalization (GDN) nonlinearities.

In some implementations, the compressed representation of the data includes a bit stream.

In some implementations, the method further includes transmitting or storing the compressed representation of the data.

According to a second aspect there is provided a method including obtaining entropy encoded representations of: (i) a latent representation of a set of data, and (ii) a latent representation of an entropy model used to entropy encode the latent representation of the data. The latent representation of the entropy model was determined by processing the latent representation of the data using a hyper-encoder neural network. The entropy model is defined by one or more probability distribution parameters characterizing one or more code symbol probability distributions. The latent representation of the data is entropy decoded, including determining the probability distribution parameters defining the entropy model using the latent representation of the entropy model. The latent representation of the data is entropy decoded using the entropy model, including, for one or more code symbols of a quantization of the latent representation of the data, processing: (i) one or more preceding code symbols of the quantized latent representation of the data that precede the code symbol in an ordering of the code symbols of the quantized latent representation of the data, and (ii) a quantization of the latent representation of the entropy model, to generate a code symbol probability distribution corresponding to the code symbol of the quantized latent representation of the data. The code symbol probability distribution corresponding to the code symbol of the quantized latent representation of the data is used to entropy decode the code symbol of the quantized latent representation of the data. A reconstruction of the data is determined from the latent representation of the data, including processing the latent representation of the data using a using a decoder neural network.

According to a third aspect there is provided a method implemented by a data processing apparatus, including processing data using an encoder neural network to generate a latent representation of the data. The latent representation of the data includes an ordered collection of code symbols representing the data. The latent representation of the data is processed using a hyper-encoder neural network to generate a latent representation of an entropy model. The entropy model is defined by one or more probability distribution parameters characterizing one or more code symbol probability distributions. An entropy encoded representation of the latent representation of the entropy model is generated. An entropy encoded representation of the latent representation of the data is generated using the latent representation of the entropy model, including determining the probability distribution parameters defining the entropy model using the latent representation of the entropy model. The entropy encoded representation of the latent representation of the data is generated using the entropy model. A compressed representation of the data is determined from the entropy encoded representations of: (i) the latent representation of the data and (ii) the latent representation of the entropy model used to entropy encode the latent representation of the data.

In some implementations, processing the data using an encoder neural network to generate a latent representation of the data includes determining the ordered collection of code symbols representing the data by quantizing the output of the encoder neural network.

In some implementations, generating the entropy encoded representation of the latent representation of the entropy model includes quantizing the latent representation of the entropy model.

In some implementations, the entropy model is defined by a respective code symbol probability distribution for each code symbol in the latent representation of the data.

In some implementations, each code symbol probability distribution is a Gaussian distribution convolved with a uniform distribution, and the respective probability distribution parameters defining each code symbol probability distribution include a respective mean and standard deviation parameters of the Gaussian distribution.

In some implementations, generating an entropy encoded representation of the latent representation of the entropy model includes entropy encoding the latent representation of entropy model using one or more predetermined probability distributions.

In some implementations, generating the entropy encoded representation of the latent representation of the data using the entropy model includes arithmetic encoding the latent representation of the data using the code symbol probability distributions defining the entropy model.

In some implementations, determining the probability distribution parameters defining the entropy model using the latent representation of the entropy model includes processing the latent representation of the entropy model by one or more neural network layers.

In some implementations, the method further includes autoregressively processing the code symbols of the latent representation of the data by one or more neural network layers to generate a set of context outputs. The context outputs and the latent representation of the entropy model are processed by one or more neural network layers to generate the probability distribution parameters defining the entropy model.

In some implementations, parameters of neural network layers used to: (i) generate the compression representation of the data, and (ii) generate a reconstruction of the data from the compressed representation of the data, are jointly trained using a machine learning training technique to optimize a rate-distortion performance measure.

In some implementations, the rate-distortion performance measure includes: (i) a first rate term based on a size of the entropy encoded representation of the latent representation of the data, (ii) a second rate term based on a size of the entropy encoded representation of the latent representation of the entropy model, and (iii) a distortion term based on a difference between the data and the reconstruction of the data.

In some implementations, the distortion term is scaled by a hyper-parameter determining a rate-distortion tradeoff.

In some implementations, the encoder neural network includes one or more generalized divisive normalization (GDN) nonlinearities.

In some implementations, the compressed representation of the data includes a bit stream.

In some implementations, the method further includes transmitting or storing the compressed representation of the data.

According to a fourth aspect there is provided a method implemented by a data processing apparatus, including obtaining entropy encoded representations of: (i) a latent representation of data comprising an ordered collection of code symbols representing the data, and (ii) a latent representation of an entropy model used to entropy encode the latent representation of the data. The latent representation of the entropy model is determined by processing the latent representation of the data using a hyper-encoder neural network. The entropy model is defined by one or more probability distribution parameters characterizing one or more code symbol probability distributions. The latent representation of the data is entropy decoded, including determining the probability distribution parameters defining the entropy model using the latent representation of the entropy model. The latent representation of the data is entropy decoded using the entropy model. The data is determined (reconstructed) from the latent representation of the data, including processing the latent representation of the data using a using a decoder neural network.

As described, the compression system entropy encodes a latent representation of the data which is determined by processing the data using an encoder neural network. However, in some cases, the compression system does not include the encoder neural network and directly entropy encodes the components of the input data. For example, if the input data is an image, the compression system may directly entropy encode the pixel intensity/color values of the image. When the compression system directly entropy encodes the components of the input data (i.e., without using an encoder neural network), the decompression system similarly directly entropy decodes the components of the input data (i.e., without using a decoder neural network). An example of such a method may include a method implemented by a data processing apparatus, the method including: processing data using a hyper-encoder neural network to generate a latent representation of an entropy model, where the entropy model is defined by one or more probability distribution parameters characterizing one or more code symbol probability distributions; generating an entropy encoded representation of the latent representation of the entropy model; generating an entropy encoded representation of the data using the latent representation of the entropy model, including: determining the probability distribution parameters defining the entropy model using the latent representation of the entropy model; and generating the entropy encoded representation of the data using the entropy model; and determining a compressed representation of the data from the entropy encoded representations of: (i) the data and (ii) the latent representation of the entropy model used to entropy encode the data.

According to a fifth aspect there is provided a system including one or more computers and one or more storage devices storing instructions that when executed by the one or more computers cause the one or more computers to perform the operations of the respective method of any previous aspect.

According to a sixth aspect there is provided one or more computer storage media storing instructions that when executed by one or more computers cause the one or more computers to perform the operations of the respective method of any previous aspect.

Particular embodiments of the subject matter described in this specification can be implemented so as to realize one or more of the following advantages.

The compression system described in this specification compresses input data using a conditional entropy model that is determined based on the input data (using neural networks), rather than using, e.g., a static, predetermined entropy model. Determining the entropy model based on the input data enables the entropy model to be richer and more accurate, e.g., by capturing spatial dependencies in the input data, and thereby enables the input data to be compressed at a higher rate than can be achieved in some conventional systems.

The system described in this specification determines the conditional entropy model using a collection of neural networks that are jointly trained to optimize a rate distortion objective function. To determine the conditional entropy model, the system can process a quantized latent representation of the data using a "hyper-encoder" neural network to generate a "hyper-prior" that implicitly characterizes the conditional entropy model. The hyper-prior is subsequently compressed and included as side-information in the compressed representation of the input data. Generally, a more complex hyper-prior can specify a more accurate conditional entropy model that enables the input data to be compressed at a higher rate. However, increasing the complexity of the hyper-prior may cause the hyper-prior itself to be compressed at a lower rate. The system described in this specification is trained using machine learning techniques to adaptively determine the complexity of the hyper-prior for each set of input data, in order to optimize the overall compression rate. This allows the system described in this specification to achieve higher compression rates than some conventional systems.

The system described in this specification can determine the conditional entropy model used to compress the input data using an autoregressive "context" neural network that enables the system to learn a richer entropy model without increasing the size of the compressed representation of the data. The system can jointly train the hyper-encoder neural network and the autoregressive context neural network, thereby enabling the hyper-prior to store information needed to reduce uncertainty in the context neural network while avoiding information that can be accurately predicted by the autoregressive context neural network.

By compressing and decompressing data more efficiently than conventional systems, the system described in this specification may enable more efficient data transmission (e.g., by reducing the communications network bandwidth required to transmit data) and more efficient data storage (e.g., by reducing the amount of memory required to store data). Moreover, through the disclosed approach improved efficiency may be achieved without compromising data quality and/or authenticity.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a data compression system and a data decompression system. The compression system is configured to process input data (e.g., image data, audio data, video data, text data, or any other appropriate sort of data) to generate a compressed representation of the input data. The decompression system can process the compressed data to generate an (approximate or exact) reconstruction of the input data.

Generally, the compression and decompression systems may be co-located or remotely located, and compressed data generated by the compression system can be provided to the decompression system in any of a variety of ways. For example, the compressed data may be stored (e.g., in a physical data storage device or logical data storage area), and then subsequently retrieved from storage and provided to the decompression system. As another example, the compressed data may be transmitted over a communications network (e.g., the Internet) to a destination, where it is subsequently retrieved and provided to the decompression system.

To compress the input data, the compression system maps the input data to a quantized latent representation as an ordered collection of "code symbols", e.g., a vector or matrix of code symbols. Each code symbol is drawn from a discrete set of possible code symbols, e.g., a set of integer values. The compression system compresses the code symbols by entropy encoding them using a conditional entropy model, i.e., an entropy model that depends on the input data.

The conditional entropy model defines a respective code symbol probability distribution (i.e., probability distribution over the set of possible code symbols) corresponding to each code symbol in the ordered collection of code symbols representing the input data. The compression system then generates the compressed representation of the input data based on: (i) the compressed code symbols, and (ii) "side-information" characterizing the conditional entropy model used to compress the code symbols.

The decompression system can decompress the data by recovering the conditional entropy model from the compressed data, and using the conditional entropy model to decompress (i.e., entropy decode) the compressed code symbols. The decompression system can then reconstruct the original input data by mapping the code symbols back to a reconstruction of the input data.

Using a conditional entropy model that is adaptive and input data-dependent (rather than, e.g., a static, predetermined entropy model) can enable the input data to be compressed more effectively. These features and other features are described in more detail below.

Figure 1:
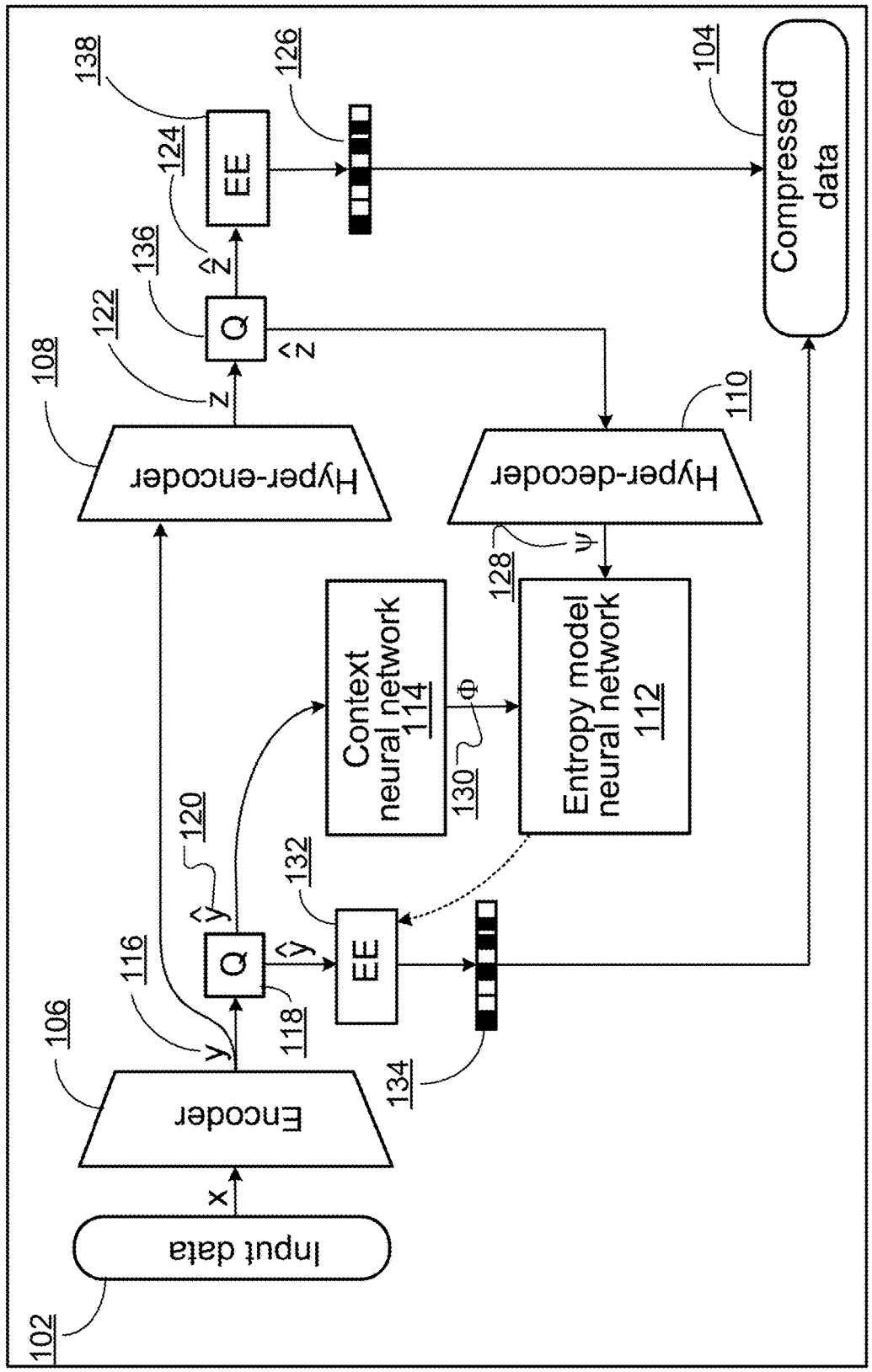
FIG. 1 is a block diagram of an example compression system.

FIG. 1 is a block diagram of an example compression system 100. The compression system 100 is an example system implemented as computer programs on one or more computers in one or more locations in which the systems, components, and techniques described below are implemented.

The compression system 100 processes the input data 102 to generate compressed data 104 representing the input data 102 using: (1) an encoder neural network 106, (2) a hyper-encoder neural network 108, (3) a hyper-decoder neural network 110, (4) an entropy model neural network 112, and optionally, (5) a context neural network 114. The neural networks used by the compression system are jointly trained (along with neural networks used by the decompression system) using a rate-distortion objective function, as will be described in more detail with reference to FIG. 2. Generally, each neural network described in this document can have any appropriate neural network architecture that enables it to perform its described function. Example architectures of the neural networks used by the compression and decompression systems are described in more detail with reference to FIG. 3.

The encoder neural network 106 is configured to process the input data 102 (x) to generate a latent representation 116 (y) of the input data 102. As used throughout this document, a "latent representation" of data refers to a representation of the data as an ordered collection of numerical values, e.g., a vector or matrix of numerical values. In one example, the input data may be an image, the encoder neural network 106 may be a convolutional neural network, and the latent representation 116 of the input data may be a multi-channel feature map output by the final layer of the encoder neural network 106. Generally, the latent representation 116 of the input data may be more compressible than the input data itself, and in some cases, may have a lower dimensionality than the input data.

To facilitate compression of the latent representation 116 of the input data using entropy encoding techniques, the compression system 100 quantizes the latent representation 116 of the input data using a quantizer Q 118 to generate an ordered collection of code symbols 120 (ŷ). Quantizing a value refers to mapping the value to a member of a discrete set of possible code symbols. For example, the set of possible code symbols may be integer values, and the compression system 100 may perform quantization by rounding real-valued numbers to integer values.

The compression system 100 uses the hyper-encoder neural network 108, the hyper-decoder neural network 110, and the entropy model neural network 112 to generate a conditional entropy model for entropy encoding the code symbols 120 representing the input data, as will be described in more detail next.

The hyper-encoder neural network 108 is configured to process the latent representation 116 of the input data to generate a "hyper-prior" 122 (z) (sometimes called a "hyper-parameter"), that is, a latent representation of the conditional entropy model. In one example, the hyper-encoder neural network 108 may be a convolutional neural network, and the hyper-prior 122 may be a multi-channel feature map output by the final layer of the hyper-encoder neural network 108. The hyper-prior implicitly characterizes an input data-dependent entropy model that will enable the code symbols 120 representing the input data to be efficiently compressed.

The compressed data 104 generally includes a compressed representation of the hyper-prior 122 to enable the decompression system to recover the conditional entropy model. To this end, the compression system 100 quantizes the hyper-prior 122 using the quantizer Q 136 to generate the quantized hyper-prior 124 ($\hat{z}$), and generates a compressed representation 126 of the quantized hyper-prior 124, e.g., as a bit string, i.e., a string of binary digits. In one example, the compression system 100 compresses the quantized hyper-prior 124 using the entropy encoding engine 138 in accordance with a predetermined entropy model that specifies one or more predetermined code symbol probability distributions.

The hyper-decoder neural network 110 is configured to process the quantized hyper-prior 124 to generate a hyper-decoder output 128 ($\Psi$), and the entropy model neural network 112 is configured to process the hyper-decoder output 128 to generate the conditional entropy model. That is, the hyper-decoder 110 and the entropy model neural network 112 jointly decode the quantized hyper-prior to generate an output that explicitly defines the conditional entropy model.

The conditional entropy model specifies a respective code symbol probability distribution corresponding to each code symbol 116 representing the input data. Generally, the output of the entropy model neural network 112 includes distribution parameters that define each code symbol probability distribution of the conditional entropy model. In one example, each code symbol probability distribution of the conditional entropy model may be a Gaussian distribution (parameterized by mean and standard deviation parameters) convolved with a unit uniform distribution. In this example, the output of the entropy model neural network 112 may specify respective values of the Gaussian mean and standard deviation parameters for each code symbol probability distribution of the conditional entropy model.

Optionally, the compression system 100 can additionally use the context neural network 114 in determining the conditional entropy model. The context neural network 114 is configured to autoregressively process the code symbols 120 representing the input data (i.e., in accordance with an ordering of the code symbols) to generate a respective "context output" 130 ($\Phi$) for each code symbol. The context output for each code symbol only depends on code symbols that precede the code symbol in the ordered collection of code symbols representing the input data, and not on the code symbol itself or on code symbols that follow the code symbol. The context output 130 for a code symbol can be understood as causal contextual information that can be used by the entropy model neural network 112 to generate a more accurate code symbol probability distribution for the code symbol.

The entropy model neural network 112 can process the context outputs 130 generated by the context neural network 114 (i.e., in addition to the hyper-decoder output 128) to generate the conditional entropy model. Generally, the code symbol probability distribution for each code symbol depends on the context output for the code symbol, and optionally, on context outputs for code symbols that precede the code symbol, but not on context outputs for code symbols that follow the code symbol. This results in a causal dependence of the conditional entropy model on the code symbols representing the input data which ensures that the decompression system can recover the conditional entropy model from the compressed data, as will be described in more detail with reference to FIG. 2.

In contrast to the hyper-prior 122, which must be included as side-information in the compressed data 104 (thereby adding to the total compressed file size), the autoregressive context neural network 114 provides a source of "free" information (discounting computational costs) as it does not require adding any side-information. Jointly training the context neural network 114 and the hyper-encoder 108 enables the hyper-prior 122 to store information that is complementary to the context outputs 130 while avoiding information that can be accurately predicted using the context outputs 130.

The entropy encoding engine 132 is configured to compress the code symbols 120 representing the input data by entropy encoding them in accordance with the conditional entropy model. The entropy encoding engine 132 can implement any appropriate entropy encoding technique, e.g., an arithmetic coding technique, a range coding technique, or a Huffman coding technique. The compressed code symbols 134 may be represented in any of a variety of ways, e.g., as a bit string.

The compression system 100 generates the compressed data 104 based on: (i) the compressed code symbols 134, and (ii) the compressed hyper-prior 126. For example, the compression system may generate the compressed data by concatenating respective bit strings representing the compressed code symbols 134 and the compressed hyper-prior 126.

In some cases, the compression system 100 determines the entropy model used to entropy encode the code symbols representing the data using the context neural network 114 but not the hyper-prior 122. In these cases, the compression system 100 does not use the hyper-encoder network 108 or the hyper-decoder network 110. Rather, the system generates the entropy model by autoregressively processing the code symbols 120 representing the data to generate context outputs 130, and then processing the context outputs 130 using the entropy model neural network 112.

Figure 2:
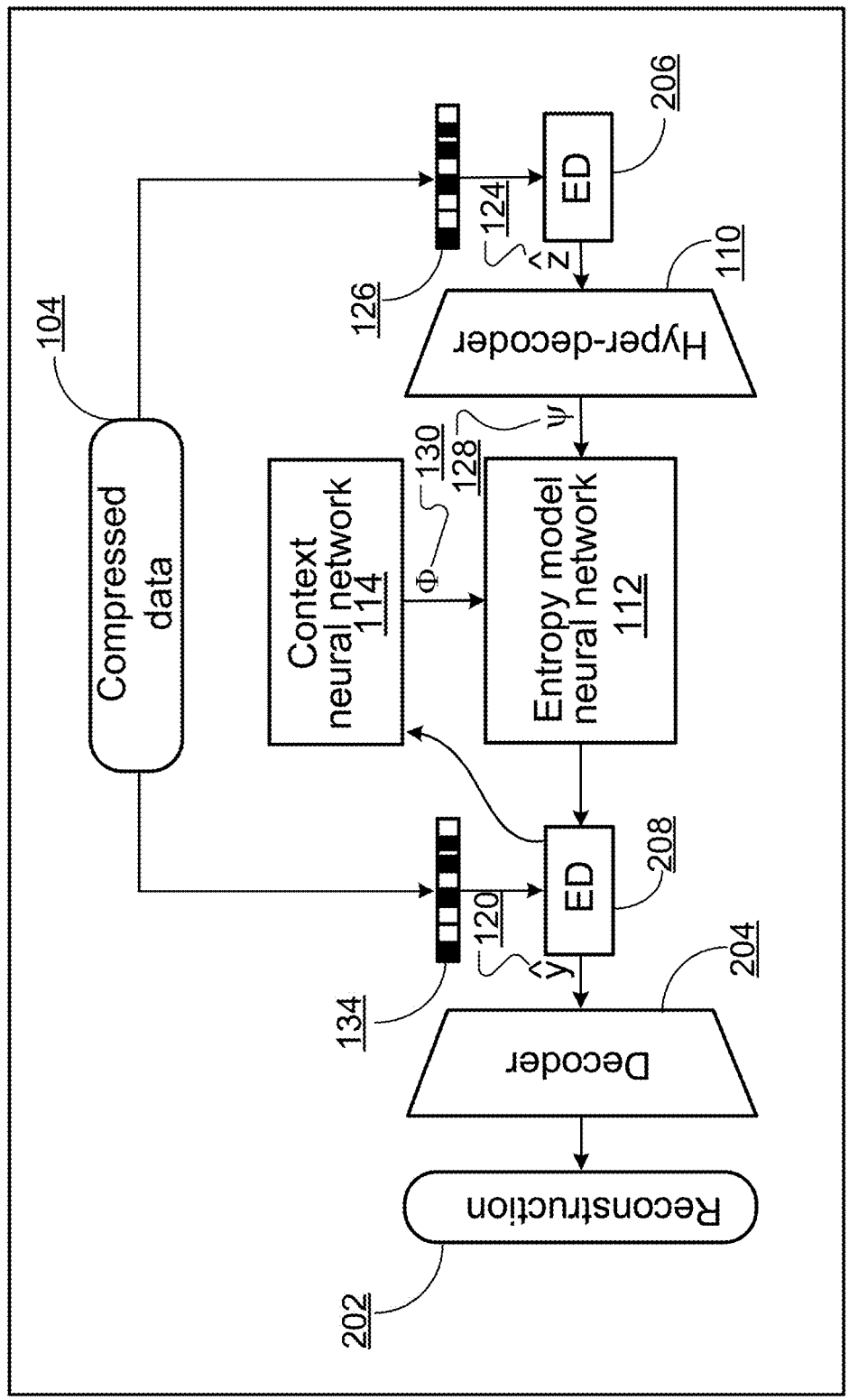
FIG. 2 is a block diagram of an example decompression system.

FIG. 2 is a block diagram of an example decompression system 200. The decompression system 200 is an example system implemented as computer programs on one or more computers in one or more locations in which the systems, components, and techniques described below are implemented.

The decompression system 200 processes the compressed data 104 generated by the compression system to generate a reconstruction 202 that approximates the original input data, using: (1) the hyper-decoder neural network 110, (2) the entropy model neural network 112, (3) a decoder neural network 204, and optionally, (4) the context neural network 114. The hyper-decoder neural network 110, the entropy model neural network 112, and the context neural network 114 used by the decompression system share the same parameter values as the corresponding neural networks used by the compression system.

To recover the conditional entropy model, the decompression system 200 obtains the quantized hyper-prior 124 from the compressed data 104. For example, the decompression system 200 may obtain the quantized hyper-prior 124 by using the entropy decoding engine 206 to entropy decode the compressed representation 126 of the quantized hyper-prior 124 that is included in the compressed data 104. In this example, the entropy decoding engine 206 may entropy decode the compressed representation 126 of the quantized hyper-prior 124 using the same (e.g., predetermined) entropy model that was used to entropy encode it.

The hyper-decoder neural network 110 is configured to process the quantized hyper-prior 124 to generate a hyper-decoder output 128 (Φ), and the entropy model neural network 112 is configured to process the hyper-decoder output 128 to generate the conditional entropy model, i.e., in a similar manner to the compression system. The entropy decoding engine 208 is configured to entropy decode the compressed code symbols 134 included in the compressed data 104 in accordance with the conditional entropy model to recover the code symbols 120.

In cases where the compression system used the context neural network 114 to determine the conditional entropy model, the decompression system 200 also uses the context neural network 114 to recover the conditional entropy model. As described with reference to FIG. 1, the context neural network 114 is configured to autoregressively process the code symbols 120 representing the input data to generate a respective context output 130 for each code symbol. After initially receiving the compressed data 104, the decompression system 200 does not have access to the full set of decompressed code symbols 120 that are provided as inputs to the context neural network 114. As will be described in more detail below, the decompression system 200 accounts for this by sequentially decompressing the code symbols 120 in accordance with the ordering of the code symbols. The context outputs 130 generated by the context neural network 114 are provided to the entropy model neural network 112, which processes the context outputs 130 along with the hyper-decoder output 128 to generate the conditional entropy model.

To account for the decompression system 200 not initially having access to the full set of decompressed code symbols 120 that are provided as inputs to the context neural network 114, the decompression system 200 sequentially decompresses the code symbols 120 in accordance with the ordering of the code symbols. In particular, the decompression system may decompress the first code symbol using, e.g., a predetermined code symbol probability distribution. To decompress each subsequent code symbol, the context neural network 114 processes one or more preceding code symbols (i.e., that have already been decompressed) to generate a corresponding context output 130. The entropy model neural network 112 then processes the (i) context output 130, (ii) the hyper-decoder output 128, and optionally (iii) one or more preceding context outputs 130, to generate the corresponding code symbol probability distribution, which is subsequently used to decompress the code symbol.

The decoder neural network 204 is configured to process the ordered collection of code symbols 120 to generate the reconstruction 202 approximating the input data. That is, the operations performed by the decoder neural network 204 approximately invert the operations performed by the encoder neural network described with reference to FIG. 1.

In some cases, the decompression system 200 determines the entropy model used to entropy decode the code symbols representing the data using the context neural network 114 but not the hyper-prior. In these cases, the decompression system 200 does not use the hyper-decoder network 110. Rather, the system generates the entropy model by autoregressively processing the code symbols 120 representing the data to generate context outputs 130, and then processing the context outputs 130 using the entropy model neural network 112.

The compression system and the decompression system can be jointly trained using machine learning training techniques (e.g., stochastic gradient descent) to optimize a rate-distortion objective function. More specifically, the encoder neural network, the hyper-encoder neural network, the hyper-decoder neural network, the context neural network, the entropy model neural network, and the decoder neural network can be jointly trained to optimize the rate distortion objective function. In one example, the rate-distortion objective function ("performance measure") $\mathcal{L}$ may be given by:

$$\mathcal{L} = R_{latent} + R_{hyper-prior} + \lambda \cdot E_{reconstruction} \quad (1)$$

$$R_{latent} = -\log p_{\hat{y}}(\hat{y}) \quad (2)$$

$$R_{hyper-code} = -\log p_{\hat{z}}(\hat{z}) \quad (3)$$

$$E_{reconstruction} = |x - \hat{x}|_2^2 \quad (4)$$

where $p_{\hat{y}}(\hat{y})$ refers to the probability of the code symbols representing the input data $\hat{y}$ under the conditional entropy model $p_{\hat{y}}(\cdot)$ used to entropy encode the code symbols, $p_{\hat{z}}(\hat{z})$ refers to the probability of the quantized hyper-prior $\hat{z}$ under the entropy model $p_{\hat{z}}(\cdot)$ used to entropy encode the quantized hyper-prior, $\lambda$ is a parameter determining the rate-distortion tradeoff, and $|x-\hat{x}|_2^2$ refers to a norm of a difference between the input data x and the reconstruction of the input data $\hat{x}$. In the rate distortion objective function described with reference to equations (1)-(4), $R_{latent}$ characterizes the size (e.g., in bits) of the compressed code symbols representing the input data, $R_{hyper-prior}$ characterizes the size (e.g., in bits) of the compressed hyper-prior, and $E_{reconstruction}$ characterizes the difference ("distortion") between the input data and the reconstruction of the input data.

Generally, a more complex hyper-prior can specify a more accurate conditional entropy model that enables the code symbols representing the input data to be compressed at a higher rate. However, increasing the complexity of the hyper-prior may cause the hyper-prior itself to be compressed at a lower rate. By jointly training the compression and decompression systems, a balance between: (i) the size of the compressed hyper-prior, and (ii) the increased compression rate from a more accurate entropy model, can be directly learned from training data.

In some implementations, the compression system and the decompression system do not use an encoder neural network or a decoder neural network. In these implementations, the compression system can generate the code symbols representing the input data by directly quantizing the input data, and the decompression system can generate the reconstruction of the input data as the result of decompressing the code symbols, as described above.

Figure 3:
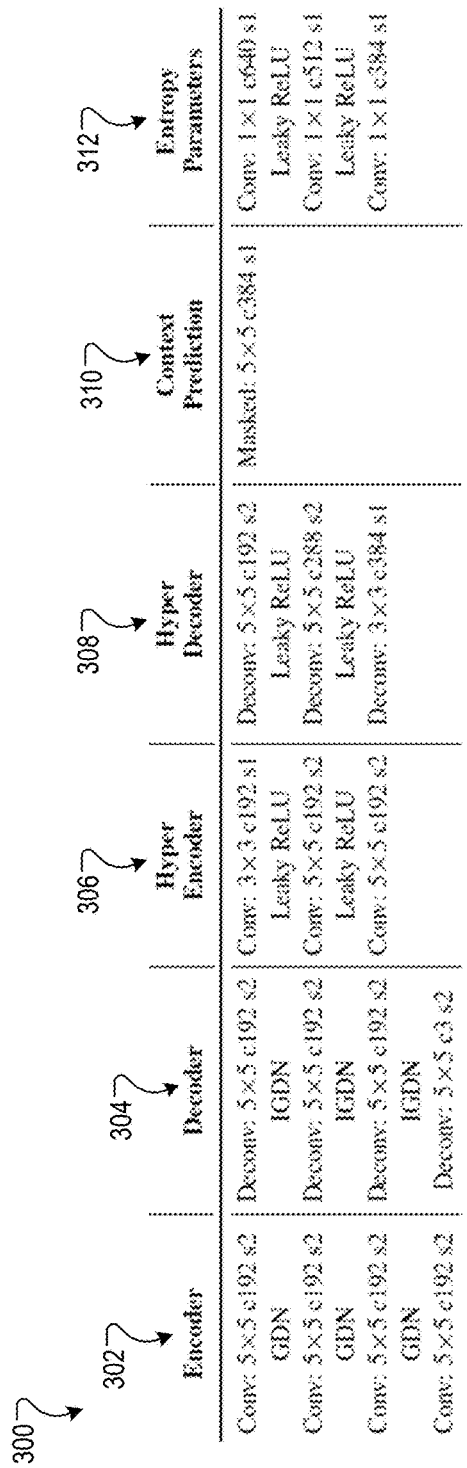
FIG. 3 shows a table that describes example architectures of the neural networks used by the compression/decompression systems.

FIG. 3 shows a table 300 that describes example architectures of the neural networks used by the compression/decompression systems, in the particular case where the input data consists of images. More specifically, the table 300 describes example architectures of the encoder neural network 302, the decoder neural network 304, the hyper-encoder neural network 306, the hyper-decoder neural network 308, the context neural network 310, and the entropy model neural network 312.

Each row of the table 300 corresponds to a respective layer. Convolutional layers are specified with the "Conv" prefix followed by kernel size, number of channels, and downsampling stride. For example, the first layer of the encoder neural network 302 uses 5×5 kernels with 192 channels and a stride of 2. The "Deconv" prefix corresponds to upsampled convolutions, while "Masked" corresponds to masked convolutions. GDN stands for generalized divisive normalization, and IGDN is the inverse of GDN.

In the example architecture described with reference to FIG. 3, the entropy model neural network uses 1×1 kernels. This architecture enables the entropy model neural network to generate a conditional entropy model having the property that the code symbol probability distribution corresponding to each code symbol does not depend on context outputs corresponding to subsequent code symbols (as described earlier). As another example, the same effect could be achieved by using masked convolutional kernels.

Figure 4:
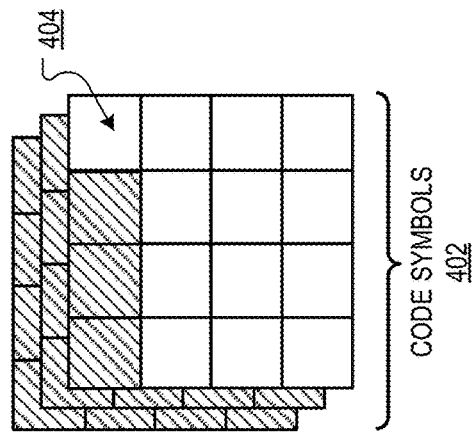
FIG. 4 illustrates an example of the dependence of context outputs generated by the context neural network on the ordered collection of code symbols representing the input data.

FIG. 4 illustrates an example of the dependence of context outputs generated by the context neural network on the ordered collection of code symbols 402 representing the input data. To generate the context output for the code symbol 404, the context neural network processes one or more code symbols that precede the code symbol 404, which are illustrated as being shaded.

Figure 5:
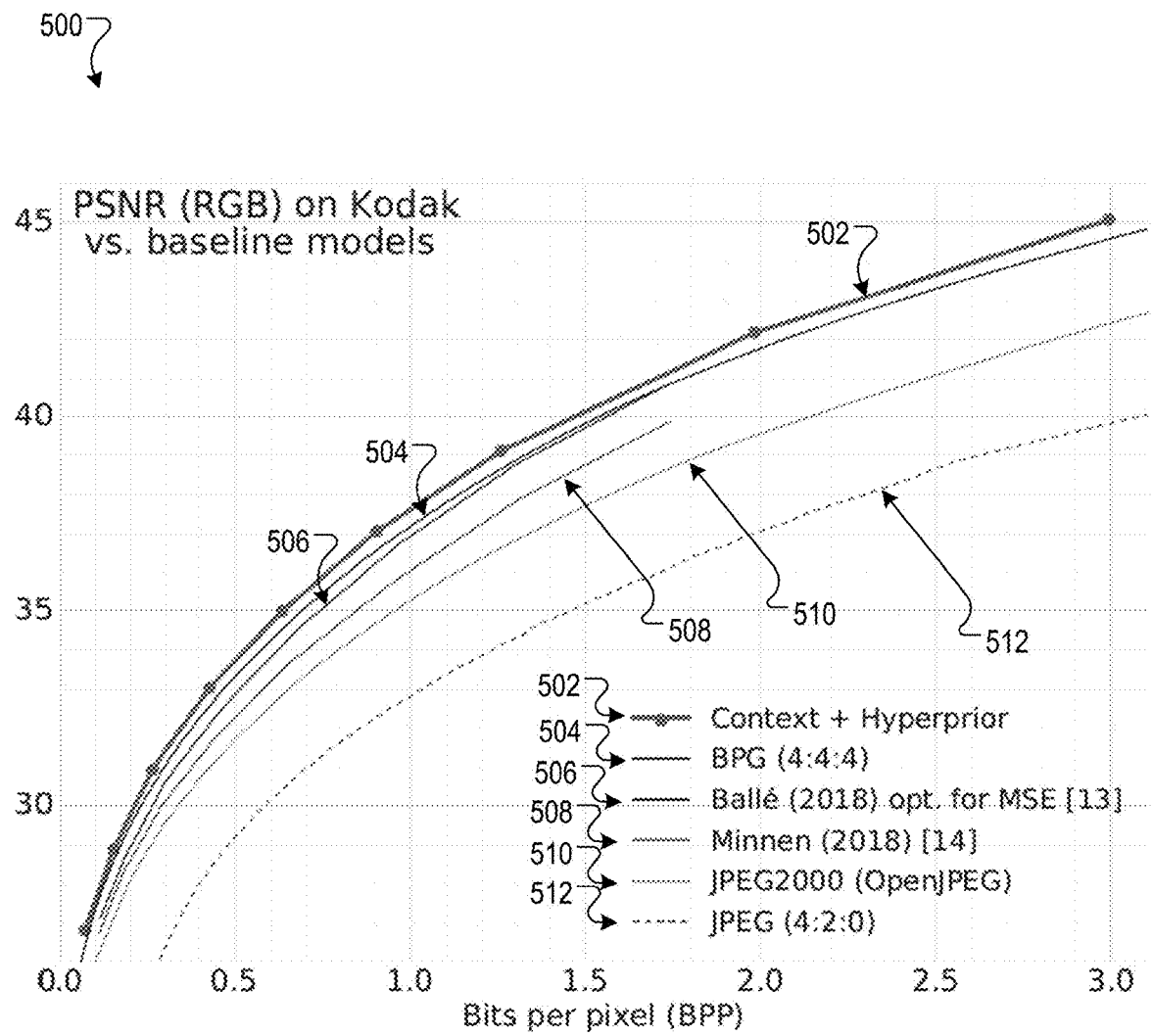
FIG. 5 illustrates a rate distortion plot that compares the performance of the compression/decompression systems described in this specification with the performance of other compression/decompression systems.

FIG. 5 illustrates a rate distortion plot 500 that compares the performance of the compression/decompression systems described in this specification with the performance of other compression/decompression systems. For each compression/decompression system, the rate distortion plot 500 shows the peak signal-to-noise ratio (PSNR) achieved by the system (on the vertical axis) for a variety of bits per pixel (BPP) compression rates (on the horizontal axis).

The line 502 on the plot 500 corresponds to the compression/decompression systems described in this specification, the line 504 corresponds to the Better Portable Graphics (BPG) system, the line 506 corresponds to the system described with reference to: J. Balle, D. Minnen, S. Singh, S. J. Hwang, N. Johnston, "Variational image compression with a scale hyperprior," $6^{th}$ Int. Conf. on Learning Representations, 2018, the line 508 corresponds to the system described with reference to: D. Minnen, G. Toderici, S. Singh, S. J. Hwang, M. Covell, "Image-dependent local entropy models for image compression with deep networks," Int. Conf. on Image Processing, 2018, the line 510 corresponds to the JPEG2000 system, and the line 512 corresponds to the JPEG system. It can be appreciated that the compression/decompression systems described in this specification generally outperform the other compression/decompression systems.

Figure 6:
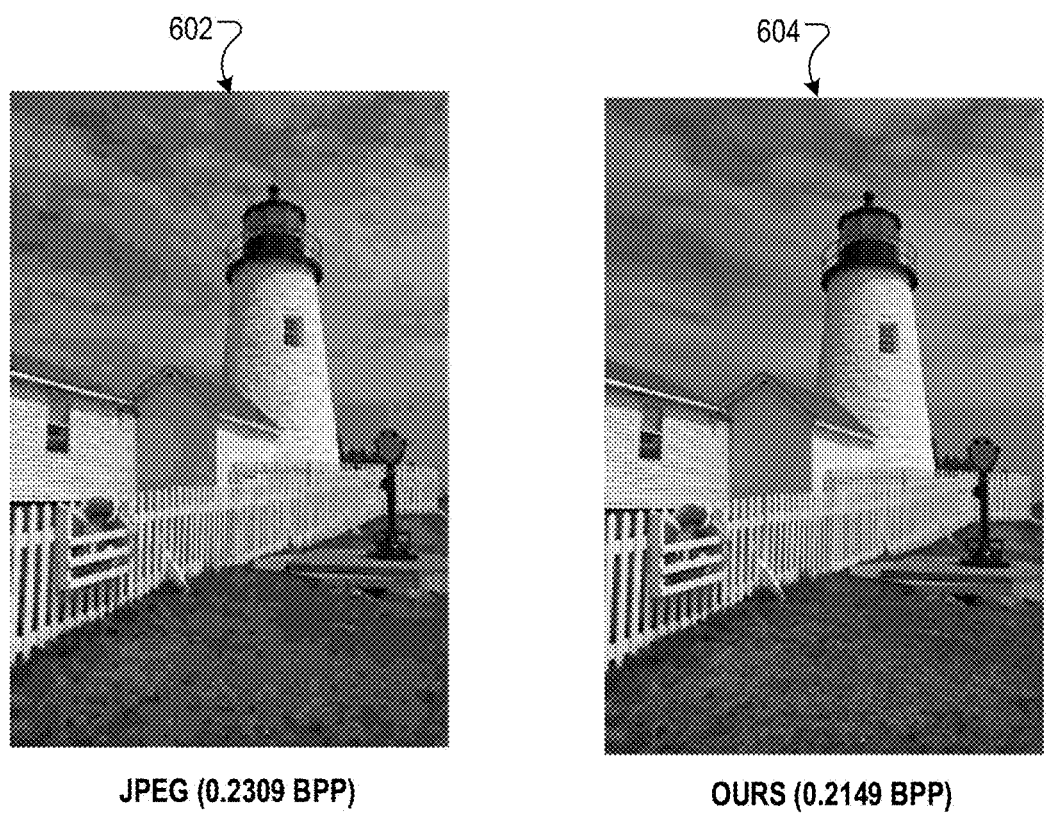
FIG. 6 illustrates a qualitative example of the performance gains that can be achieved by using the compression/decompression systems described in this specification.

FIG. 6 illustrates a qualitative example of the performance gains that can be achieved by using the compression/decompression systems described in this specification. The image 602 has been reconstructed after being compressed with 0.2309 BPP using a JPEG system, and the image 604 is the same image having been reconstructed after being compressed with 0.2149 BPP using the compression/decompression systems described in this specification. It can be appreciated that the image 604 (corresponding to the systems described in this specification) has a substantially higher quality (e.g., with fewer artifacts) than the image 602 (corresponding to JPEG), despite more BPP being used to compress the image 602 than the image 604.

Figure 7:
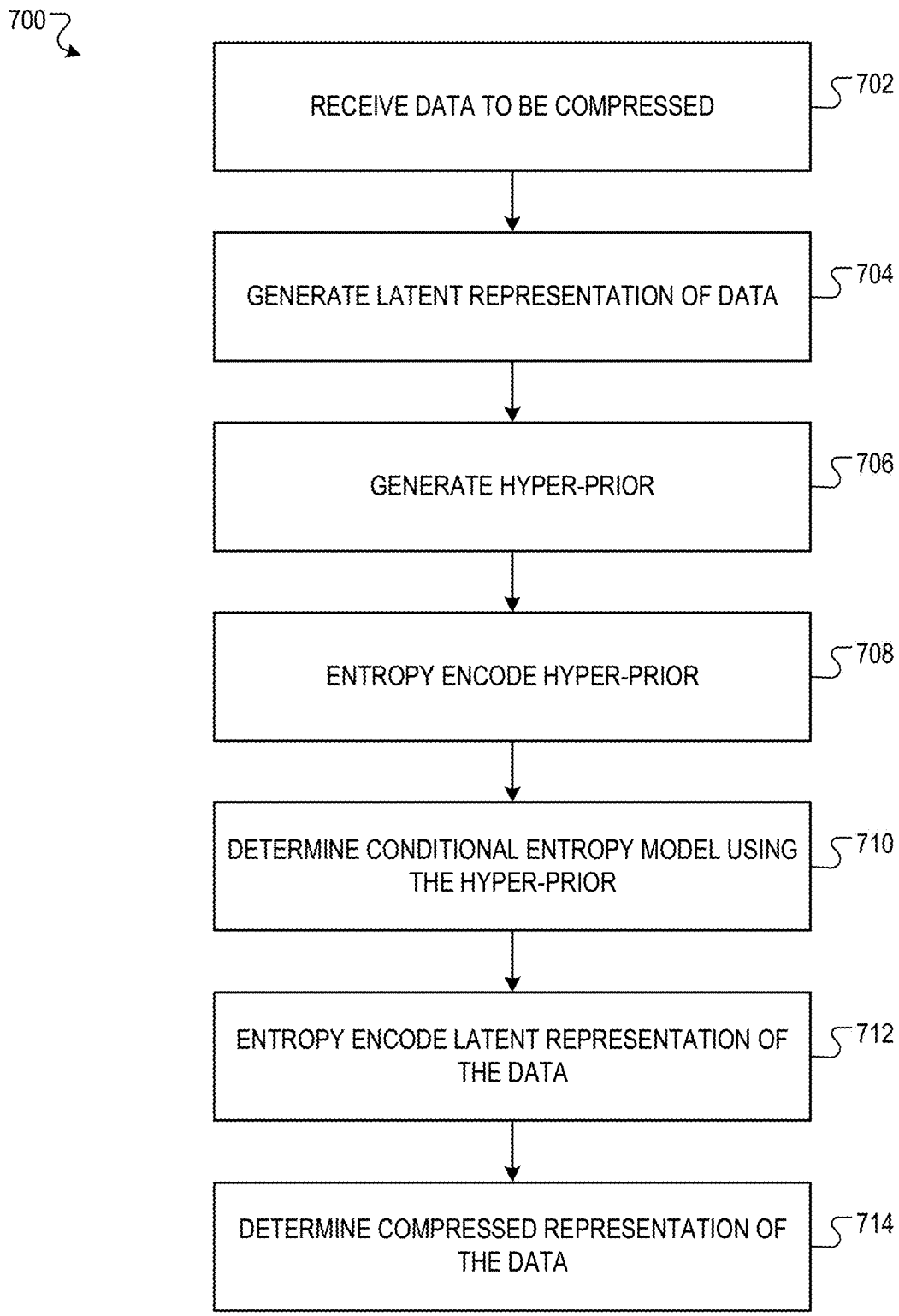
FIG. 7 is a flow diagram of an example process for compressing data.

FIG. 7 is a flow diagram of an example process 700 for compressing data. For convenience, the process 700 will be described as being performed by a system of one or more computers located in one or more locations. For example, a compression system, e.g., the compression system described with reference to FIG. 1, appropriately programmed in accordance with this specification, can perform the process 700.

The system receives the data to be compressed (702). The data may be any appropriate form of data, e.g., image data, audio data, or text data.

The system processes the data using an encoder neural network to generate a latent representation of the data (704). In one example, the data is image data, the encoder neural network is a convolutional neural network, and the latent representation of the data is an ordered collection of feature maps output by the final layer of the encoder neural network.

The system processes the latent representation of the data using a hyper-encoder neural network to generate a latent representation of a conditional entropy model, i.e., a "hyper-prior" (706). In one example, the hyper-encoder neural network is a convolutional neural network and the hyper-prior is a multi-channel feature map output by the final layer of the hyper-encoder neural network.

The system quantizes and entropy encodes the hyper-prior (708). The system can entropy encode the quantized hyper-prior using, e.g., a pre-determined entropy model defined by one or more predetermined code symbol probability distributions. In one example, the predetermined entropy model may specify a respective predetermined code symbol probability distribution for each code symbol of the quantized hyper-prior. In this example, the system may entropy encode each code symbol of the quantized hyper-prior using the corresponding predetermined code symbol probability distribution. The system can use any appropriate entropy encoding technique, e.g., a Huffman encoding technique, or an arithmetic encoding technique.

The system determines the conditional entropy model using the hyper-prior (710). In particular, the system processes the quantized hyper-prior using a hyper-decoder neural network, and then processes the hyper-decoder neural network output using an entropy model neural network to generate an output that defines the conditional entropy model. For example, the entropy model neural network may generate an output that specifies respective distribution parameters defining each code symbol probability distribution of the conditional entropy model.

In some implementations, to determine the entropy model, the system additionally uses a context neural network to autoregressively process the code symbols of the quantized latent representation of the data to generate a respective context output corresponding to each code symbol. In these implementations, the entropy model neural network generates the conditional entropy model by processing the context outputs along with the hyper-decoder neural network output.

The context neural network can have any appropriate neural network architecture that enables it to autoregressively process the code symbols of the quantized latent representation of the data. In one example, the context neural network is a masked convolutional neural network that uses masked convolutional layers with 5×5 convolution kernels. In this example, the context neural network generates the context output for each code symbol by processing a proper subset of the preceding code symbols, i.e., rather than on every preceding code symbol. In some cases, a masked convolutional layer can generate a context output for a current code symbol by dynamically zeroing components of the convolution kernel of the layer that operate on (i) the current code symbol and (ii) code symbols that follow the current code symbol.

The system entropy encodes the quantized latent representation of the data using the conditional entropy model (712). For example, the system can entropy encode each code symbol of the quantized latent representation of the data using a respective code symbol probability distribution defined by the conditional entropy model. The system can use any appropriate entropy encoding technique, e.g., a Huffman encoding technique, or an arithmetic encoding technique.

The system determines the compressed representation of the data based on: (i) the compressed (i.e., entropy encoded) quantized latent representation of the data, and (ii) the compressed (i.e., entropy encoded) quantized hyper-prior, e.g., by concatenating them (714). After determining the compressed representation of the data, the system may store the compressed representation of the data (e.g., in a logical data storage area or physical data storage device), or transmit the compressed representation of the data (e.g., over a data communication network).

Figure 8:
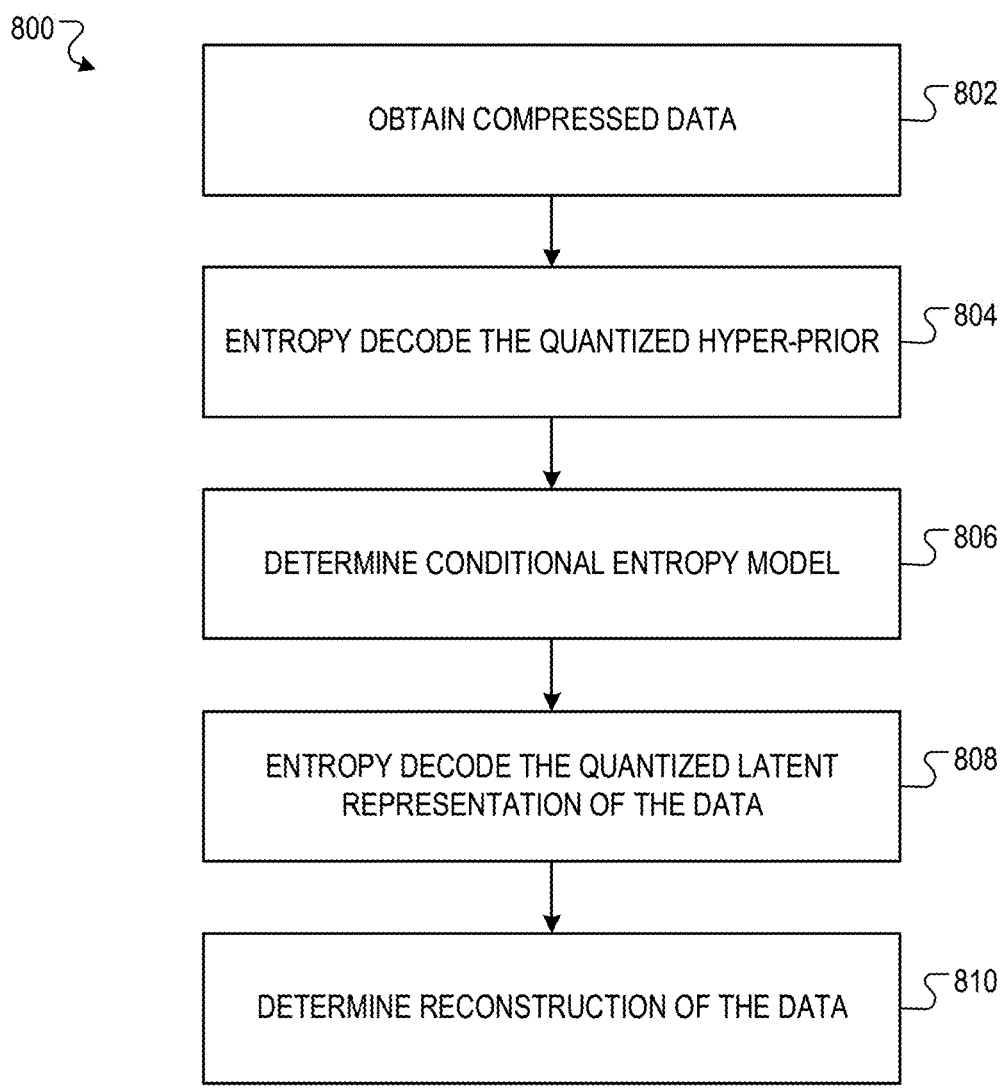
FIG. 8 is a flow diagram of an example process for decompressing data.

FIG. 8 is a flow diagram of an example process 800 for decompressing data that was compressed using the example process 700 (as described with reference to FIG. 7). For convenience, the process 800 will be described as being performed by a system of one or more computers located in one or more locations. For example, a decompression system, e.g., the decompression system described with reference to FIG. 2, appropriately programmed in accordance with this specification, can perform the process 800.

The system obtains the compressed data (802). As described above, the compressed data includes (i) a compressed (i.e., entropy encoded) quantized latent representation of the data, and (ii) a compressed (i.e., entropy encoded) quantized hyper-prior. The system may obtain the compressed data, e.g., from a data store (e.g., a logical data storage area or a physical data storage device), or as a transmission over a communication network (e.g., the Internet).

The system entropy decodes the quantized hyper-prior (804). For example, the system may entropy decode the quantized hyper-prior using a predetermined entropy model, defined by a set of predetermined code symbol probability distributions, that was used to entropy encode the quantized hyper-prior. In this example, the system may entropy decode each code symbol of the quantized hyper-prior using a corresponding predetermined code symbol probability distribution defined by the predetermined entropy model.

The system determines the conditional entropy model used to entropy encode the quantized latent representation of the data (806). To determine the conditional entropy model, the system processes the quantized hyper-prior using the hyper-decoder neural network, and then processes the hyper-decoder neural network output using the entropy model neural network to generate the distribution parameters defining the conditional entropy model. As will be described in more detail below, in some implementations, the system uses the autoregressive context neural network to determine the conditional entropy model.

The system entropy decodes the quantized latent representation of the data using the conditional entropy model (808). In particular, the system entropy decodes each code symbol of the quantized latent representation of the data using a corresponding code symbol probability distribution defined by the conditional entropy model.

In some implementations, the system determines the conditional entropy model using the context neural network. As described above, the context neural network is configured to autoregressively process the code symbols of the latent representation of the data to generate a respective context output for each code symbol. The entropy model neural network generates the conditional entropy model by processing the context outputs in addition to the hyper-decoder neural network output.

In these implementations, the system sequentially entropy decodes the code symbols of the quantized latent representation of the data. For example, to entropy decode the first code symbol, the context neural network may process a placeholder input to generate a corresponding context output. The entropy model neural network may process the context output along with the hyper-decoder neural network output to generate a corresponding code symbol probability distribution that is used to entropy decode the first code symbol. For each subsequent code symbol, the context neural network may process an input that includes one or more preceding code symbols (i.e., that have already been entropy decoded) to generate a corresponding context output. Then, as before, the entropy model neural network may process the context output for the code symbol along with the hyper-decoder neural network output to generate a corresponding code symbol probability distribution that is used to entropy decode the code symbol.

The system determines the reconstruction of the data by processing the quantized latent representation of the data using the decoder neural network (810). In one example, the decoder neural network may be a de-convolutional neural network that processes the quantized latent representation of image data to generate an (approximate or exact) reconstruction of the image data.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method implemented by one or more data processing apparatus for decompressing a compressed representation of a set of data, the method comprising:
    obtaining the compressed representation of the data, wherein the compressed representation of the data comprises respective entropy encoded representations of: (i) a latent representation of the data, and (ii) a latent representation of an entropy model used to entropy encode the latent representation of the data;
    entropy decoding the latent representation of the entropy model;
    entropy decoding the latent representation of the data, comprising:
        processing the latent representation of the entropy model using a hyper-decoder neural network to generate a reconstruction of the entropy model, wherein the reconstruction of the entropy model defines one or more code symbol probability distributions; and
        entropy decoding the latent representation of the data using the code symbol probability distributions defined by the reconstruction of the entropy model; and
    processing the latent representation of the data using a decoder neural network to generate a reconstruction of the data.

2. The method of claim 1, wherein the latent representation of the data was generated by operations comprising:
    processing the data using an encoder neural network to generate the latent representation of the data.

3. The method of claim 2, wherein the data defines an image.

4. The method of claim 2, wherein the encoder neural network comprises one or more convolutional neural network layers.

5. The method of claim 2, wherein the latent representation of the entropy model was generated by operations comprising:
    processing the latent representation of the data using a hyper-encoder neural network to generate the latent representation of the entropy model.

6. The method of claim 5, wherein the encoder neural network, the hyper-encoder neural network, the hyper-decoder neural network, and the decoder neural network have been jointly trained using a machine learning training technique to optimize a rate-distortion performance measure.

7. The method of claim 6, wherein the rate-distortion performance measure comprises: (i) a first rate term based on a size of the entropy encoded representation of the latent representation of the data, (ii) a second rate term based on a size of the entropy encoded representation of the latent representation of the entropy model, and (iii) a distortion term based on an error between the data and the reconstruction of the data.

8. The method of claim 1, wherein the latent representation of the data comprises a collection of code symbols, and the entropy model defines a respective code symbol probability distribution for each code symbol in the latent representation of the data.

9. The method of claim 8, wherein each code symbol probability distribution is a Gaussian distribution convolved with a uniform distribution.

10. The method of claim 1, wherein the latent representation of the entropy model was entropy encoded using one or more predetermined probability distributions.

11. The method of claim 1, wherein the latent representation of the data and the latent representation of the entropy model were entropy encoded using arithmetic encoding.

12. The method of claim 1, wherein the latent representation of the data comprises a plurality of code symbols associated with an ordering, and wherein entropy decoding the latent representation of the data comprises sequentially entropy decoding the code symbols in the latent representation of the data in accordance with the ordering.

13. The method of claim 12, wherein generating the reconstruction of the entropy model comprises, for each code symbol after a first code symbol in the ordering:
    processing the latent representation of the entropy model using the hyper-decoder neural network to generate a hyper-decoder neural network output;
    processing one or more preceding code symbols that precede the code symbol in the ordering using a context neural network to generate a context neural network output for the code symbol; and
    processing: (i) the hyper-decoder neural network output, and (ii) the context neural network output for the code symbol, using an entropy model neural network, to generate a code symbol probability distribution corresponding to the code symbol.

14. The method of claim 13, wherein the context neural network comprises one or more masked convolutional neural network layers.

15. The method of claim 13, wherein sequentially entropy decoding the code symbols in the latent representation of the data in accordance with the ordering comprises, for each code symbol after the first code symbol in the ordering:
   entropy decoding the code symbol using the code symbol probability distribution corresponding to the code symbol.

16. A system comprising:
   one or more computers; and
   one or more storage devices communicatively coupled to the one or more computers, wherein the one or more storage devices store instructions that, when executed by the one or more computers, cause the one or more computers to perform operations for decompressing a compressed representation of a set of data, the operations comprising:
   obtaining the compressed representation of the data, wherein the compressed representation of the data comprises respective entropy encoded representations of: (i) a latent representation of the data, and (ii) a latent representation of an entropy model used to entropy encode the latent representation of the data;
   entropy decoding the latent representation of the entropy model;
   entropy decoding the latent representation of the data, comprising:
      processing the latent representation of the entropy model using a hyper-decoder neural network to generate a reconstruction of the entropy model, wherein the reconstruction of the entropy model defines one or more code symbol probability distributions; and
      entropy decoding the latent representation of the data using the code symbol probability distributions defined by the reconstruction of the entropy model; and
   processing the latent representation of the data using a decoder neural network to generate a reconstruction of the data.

17. The system of claim 16, wherein the latent representation of the data was generated by operations comprising:
   processing the data using an encoder neural network to generate the latent representation of the data.

18. The system of claim 17, wherein the data defines an image.

19. The system of claim 17, wherein the latent representation of the entropy model was generated by operations comprising:
   processing the latent representation of the data using a hyper-encoder neural network to generate the latent representation of the entropy model.

20. One or more non-transitory computer storage media storing instructions that when executed by one or more computers cause the one or more computers to perform operations for decompressing a compressed representation of a set of data, the operations comprising:
   obtaining the compressed representation of the data, wherein the compressed representation of the data comprises respective entropy encoded representations of: (i) a latent representation of the data, and (ii) a latent representation of an entropy model used to entropy encode the latent representation of the data;
   entropy decoding the latent representation of the entropy model;
   entropy decoding the latent representation of the data, comprising:
      processing the latent representation of the entropy model using a hyper-decoder neural network to generate a reconstruction of the entropy model, wherein the reconstruction of the entropy model defines one or more code symbol probability distributions; and
      entropy decoding the latent representation of the data using the code symbol probability distributions defined by the reconstruction of the entropy model; and
   processing the latent representation of the data using a decoder neural network to generate a reconstruction of the data.

* * * * *